L. A. DRAGO.

FUEL CONTROLLING DEVICE.

APPLICATION FILED MAR. 8, 1915.

Reissued June 22, 1915.

13,933.

Witnesses

A. G. Glenman

T. R. L. Bryant.

Inventor

Louis A. Drago

By C. D. Haskins

Attorney.

THE NORRIS PETERS CO., PHOTO-LITHO., WASHINGTON, D. C.

UNITED STATES PATENT OFFICE.

LOUIS AUGUSTUS DRAGO, OF SEATTLE, WASHINGTON.

FUEL-CONTROLLING DEVICE.

Specification of Reissued Letters Patent. Reissued June 22, 1915.

Original No. 1,075,701, dated October 14, 1913, Serial No. 725,639. Application for reissue filed March 8, 1915. Serial No. 13,053.

*To all whom it may concern:*

Be it known that I, LOUIS AUGUSTUS DRAGO, a citizen of the United States, residing at Seattle, in the county of King and State of Washington, have invented a certain new and useful Improvement in Fuel-Controlling Devices, of which the following is a specification.

My invention relates to improvements in devices for controlling automatically the rate of flow of fluid fuel, and steam, for purpose of combustion, through conducting pipes from a source of supply to the point of combustion of such fuel, and the object of my invention is to provide a simple and reliable operative regulating mechanism that shall be adapted to be connected with steam-pipes and fluid fuel supply pipes which lead from a source of supply to a point of combustion and which shall be adapted automatically to control and regulate the rates of flow of the steam and the fluid fuel through such pipes, respectively, whereby proper proportions of such combustive agents may be constantly supplied at such point of combustion. I attain this object by devices illustrated in the accompanying drawings wherein—

Figure 1:
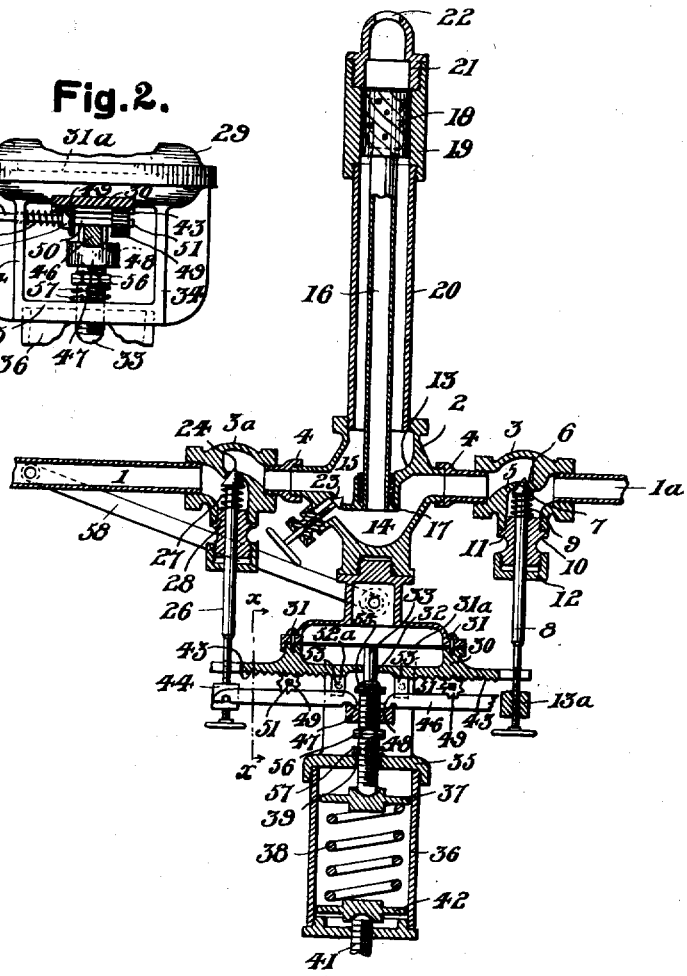
Figure 2:
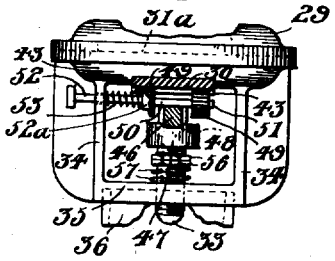

Figure 1 is a view in vertical mid-section of a structure embodying my invention showing some parts broken away and Fig. 2 is an enlarged fragmentary view of parts of the same in vertical section on broken line $x, x$ of Fig. 1, looking in the direction of the small arrow.

Referring to the drawings, throughout which like reference numerals indicate like parts, the reference numerals 1 and $1^a$ designate conducting pipes which are screw-threaded as shown, and are respectively connected to valve cases $3^a$ and 3, which valve cases are connected by fittings 4 to a hollow casting 2 in positions on opposite sides of said hollow casting 2. Within the valve case 3 is a wall 5 through which is a passageway 6 that may be closed by a valve 7 whose valve stem 8 is subjected to the upward pressure of a helical spring 9 which is disposed to surround said stem 8 and extend between the underside of the valve 7 and the top surface of a plug 10, which is screwed into the lower side of the valve casing 3 so that its shoulder 11 will engage with the surface of said lower side, and through which the valve stem 8 extends downwardly. The lower screw-threaded end of said plug 10 is provided with an internally screw-threaded collar 12 between which collar 12 and said plug 10 may be disposed a suitable packing material whereby no fluid may leak between the surfaces of the valve stem 8 and the plug 10. The downwardly extended end portion of the valve stem 8 is screw-threaded and upon such screw-threaded portion is a correspondingly screw-threaded block $13^a$. The hollow casting 2 is divided by the wall 13 into two chambers 14 and 15. Through the said wall 13 is an opening through which extends the lower end of a vertically disposed pipe 16 and between the surfaces of such opening and the external surface of the pipe 16 is disposed suitable packing 17. The pipe 16 extends upwardly and terminates within a baffle 18 which is disposed concentrically within a sleeve 19, which is secured to the upper end of a larger pipe 20 whose lower end is screwed into the hollow casting 2 to communicate with the chamber 15. To the upper end of the sleeve 19 is attached a burner-tip 21 whose orifice is in the form of a slot 22, by which slot 22 may be formed a jet of fluid fuel which, when the valve 7 is open, may flow through the supply pipe $1^a$, thence into the chamber 14, thence upwardly through the smaller pipe 16 through the baffle 18 and out of the slot 22, and within the baffle 18 such fluid fuel may mix with steam which may flow from the pipe 1 through the chamber 15 and upwardly through the large pipe 20. Extending through the wall 13 is a passageway which may be closed by a valve plug 23, through which passageway steam or compressed air may be admitted into the chamber 14 to flow upwardly through the smaller pipe 16 and through the baffle 18 to blow out any dirt that may have accumulated in said baffle 18 and during such operation the valve 7 will be disposed to close the passageway 6 in the valve case 3, but such opening through the wall 13 and the valve plug 23, may if desired, be dispensed with since such devices are not necessary to the operation of my invention.

The flow of steam from the pipe 1 into the chamber 15 may be controlled by means of a valve 24 within the valve case $3^a$ by like means and in the same manner by which the flow of fluid fuel from the pipe $1^a$ into the chamber 14 is controlled by the valve 7 in the valve case 3. A valve stem 26 to which is attached the valve 24 is subjected to the force of a spring 27 which force tends to press the valve 24 upwardly to close the passageway from the pipe 1 to the chamber 15, such spring 27 operating like the spring 9 associated with the valve 7 and valve stem 8 in the valve case 3. The valve stem 26 extends downwardly from the valve case 3ª through a plug 28 which corresponds to the plug 10 in the valve case 3, and such plug 28 on its lower end is provided with a collar corresponding to the collar 12 on the lower end of said plug 10. To the bottom end of the hollow casing 2 is secured a hollow casting 29 whose lower flanged surface engages with the surface of the top side of a circular diaphragm 31ª adjacent to the edge thereof whose corresponding under surface engages with the annular surface of the upper edges of the flange of the casting 30 whereby such diaphragm 31ª is disposed to be clamped between the castings 29 and 30 respectively, by screws 31 in the manner indicated in Fig. 1. Extending through the casting 30 in a position concentric with the diaphragm 31ª is a hole 32 through which is slidingly disposed a vertically disposed rod 33 whose upper end engages with the center of the under side of said diaphragm 31ª. Extending downwardly from the casting 30 are legs 34 which are integrally connected with a disk 35, to the under side of which disk 35 is secured a hollow cylinder 36 within which is disposed a disk 37 which is adapted to be movable upwardly in response to force exerted by a helical spring 38. The disk 35 is provided with a concentrically disposed hole 39, through which the lower end portion of the rod 33 extends to engage with the top side of the disk 37. The lower end of the cylinder 36 is closed by a cap 40 within which is disposed an adjusting screw 41 that extends through the center of said cap 40 to engage with the lower side of a disk 42 which is slidably disposed in the lower end portion of said cylinder 36 and upon which rests the lower end of the helical spring 38 so that by turning the adjusting screw 41 the effective force of the helical spring 38 may be regulated. The casting 30 between the legs 34 and parallel with the inner sides thereof is provided with toothed racks 43, as shown in Fig. 1. The lower end portion of the valve stem 26 is screw-threaded and on such screw-threaded portion is disposed a screw-threaded block 44 which corresponds to the screw-threaded block 13ª of the valve stem 8, and projecting from each of opposite sides of each of said blocks 44 and 13ª is a stud 45 over which hooks the bifurcated one end of each of bars 46 respectively, while the other end of each of said bars 46 engages with a collar 47 whereby such other ends of said bars 46 may move upwardly and downwardly in response to vertical movements of said collar 47, which collar 47 is mounted on said rod 33 and adapted to be vertically adjustable thereon thus to effect an articulated relation between the bars 46 and the rod 33. It is to be observed that these levers 46 have their inner ends hooked over the periphery of the collar 47, the latter being cup-shaped. Disposed to mesh with racks 43 are pairs of pinion wheels 49, each of which pairs of pinion wheels 49 is mounted on a different one of two shafts 50, one end portion 51 of each of which shafts 50 is squared to adapt it to fit a turning key whereby it may be rotated. The shafts 50 are disposed to engage each with the surface of the top side of the respective one of the bars 46. Extending through one of the legs 34 are shafts 52 whose inner end portions are provided each with a head block 52ª which normally bears against the side of the adjacent one of the levers 46 and is yieldingly held there by a spring 53, the upper side of said head block 52ª being in constant slidable engagement with the surface of the casting 30 to slide freely thereagainst when the inner ends of the bars 46 are disposed below the plane of the under side of said head blocks 52ª. One end of each of the springs 53 bears against its respective head block 52ª while its opposite end bears against the adjacent leg 34. The collar 47 is screw-threaded to fit a screw-threaded portion of the rod 33, whereby such collar 47 may be turned to adjust it to a desired vertical position on said rod 33 and limit nuts 55 and 56 are provided, which may be turned to a desired position, to limit the vertical movements of said rod 33. While I have indicated a relatively light spring 57 as disposed beneath the limit nut 56, such spring is not absolutely necessary for effective operation of my invention. Extending between the pipe 1 and the casting 29 is a conducting pipe 58 through which steam from the pipe 1 may gain admittance into the chamber above the diaphragm 31ª within the casting 39, whereby such steam may exert its force against the diaphragm 31ª to move such diaphragm 31ª downwardly together with the rod 33 against the force of the helical spring 38, whereby the adjacent ends of the bars 46 which are associated with said rod 33 will be permitted to move downwardly in response to the action of helical springs 27 and 9 which are associated respectively with valve stems 26 and 8.

In operating my invention the valve stems 26 and 8 are turned in the respective blocks 44 and 13ª respectively, to lower the valves 24 and 7 respectively, until the desired relative initial amounts of steam and fluid fuel are permitted to pass from pipes 1 and 1ᵃ respectively, into the chambers 14 and 15 respectively. The shafts 50, which are adjustably movable sidewise in response to a turning of the pinion wheels 49, serve as adjustably movable fulcrums for the bars 46, whose inner end portions are controlled with respect to their vertical movements by the rod 33 with which they are associated. In Fig. 1 the bars 46 are shown as fulcrumed each at the same distance from the rod 43, whereby the valves 7 and 24 stand away from their respective seats the same distance to permit steam to flow from the supply pipe 1 into the chamber 15 at the same rate that fluid fuel would flow from the pipe 1ᵃ into the chamber 14. Obviously, as steam forces the diaphragm 31ᵃ downwardly the valves 7 and 24 will be forced upwardly by springs 9 and 27 respectively, the relative extents of such upward movements will be governed entirely by the relative positions of the shafts 50 with respect to the rod 33. If less fluid fuel than steam is required to flow toward the burner-tip 21 it is only necessary to rotate the right hand pinion wheel 49 to move it farther away from the rod 33, but if a greater rate of flow of fluid fuel than of steam be required such pinion wheel 49 is turned to move it toward the rod 33; in the same manner the corresponding pinion wheel on the opposite side of the structure may be moved to affect the valve 24. The head blocks 52ᵃ, already described, have the effect of automatically governing the feed so that no less than a predetermined amount of either steam or oil may be fed to the burner. The downward movement of the hooked ends of the bars 46 necessary to free the head blocks 52ᵃ and allow them to spring over the said bars, is, of course, governed by the position of the collar 47 with respect to its stem 33. When the steam pressure becomes sufficient to cause the stem 33 and its collar 47 to move downwardly to permit the hooked ends of the bars 46 to drop below the path of the head blocks 52ᵃ, and the same spring out over the said bars, then the feed of the stem and oil will never be less than it is at that instant, until the said head blocks are manually withdrawn and the parts readjusted. A greater feed, however, is possible after the movement of the head blocks just referred to, but this is also automatically limited by the jam nuts 56 which may be adjusted anywhere along the stem 33. As the said jam nuts approach the limit of their downward movement, the light spring 57 is gradually compressed so as not to cause a too sudden stoppage of the parts, which might strip the threads or cause other damage. The tension of the large spring 38 is adjustable by means of the screw 41, as will be understood.

Manifestly, changes may be made in the forms, dimensions and arrangement of parts of my invention without departing from the spirit thereof.

What I claim is:

1. In a device of the class described, the combination with a hollow metal casting whose interior space is divided into two chambers by a partition, of a large outlet pipe disposed to lead from one of said chambers; a smaller outlet pipe connected with the other of said chambers to extend therefrom to project within said large outlet pipe in a position concentric therewith; an inlet passageway for conducting fluid under pressure into the chamber having the large outlet pipe; an inlet passageway for conducting fluid fuel into the chamber having the smaller outlet pipe; a separate controlling valve for each of said inlet passageways; a steam pipe connected to the valve which controls the inlet passageway leading to the chamber having the large outlet pipe; a fluid fuel pipe connected to the valve which controls the passageway leading to the chamber having the smaller outlet pipe; a receptacle for steam associated with said hollow body; a pipe disposed to connect said receptacle with said steam and compressed air supply pipe, a flexible diaphragm disposed to adapt it to vibrate in response to changes in the pressure of steam within said receptacle; a rod disposed to adapt it to be moved endwise in response to vibratory movements of said diaphragm; two levers each having one of its ends adjustably connected with said rod while its other end is pivotally associated with the valve stem of a different one of said valves; and an adjustable and independently movable fulcrum for each of said levers.

2. A device for regulating the flow of two combustive agents from their sources of supply to the same point of consumption, which device embodies a conducting pipe for each of said agents, a valve associated with each of said pipes and adapted to be operated to control the flow of fluid therethrough, a diaphragm adapted by suitable means to be vibrated in response to changes in the degree of pressure of one of said agents in one of said pipes, a rod disposed with one of its ends in engagement with the central portion of said diaphragm and adapted to be moved in its lengthwise direction in response to vibratory movements of said diaphragm, resilient means for pressing said rod against said diaphragm, a collar mounted on said rod and adapted to be removably secured at different desired points thereon, two levers each having one of its ends articulated with the valve stem of a different one of said valves while its other end is in connection with said rod and an adjustable and independently rolling fulcrum for each of said two levers.

3. The combination with the steam and oil inlet valves and diaphragm of an oil burner, of a spring-pressed stem centrally connected to the diaphragm and adapted to vibrate therewith, an adjustable recessed collar upon said stem, levers connected with the said valves and adapted to hook over the annular edge formed by the said recess, racks fixed with respect to the frame of the burner, and pinions which coöperate with the said racks and form movable fulcrums for the said levers, whereby varying movements thereof are permitted as the diaphragm is vibrated, and safety locks adapted to limit the movement of said valves.

4. The combination with the steam and oil inlet valves and diaphragm of an oil burner, of a spring-pressed stem centrally connected to the diaphragm and adapted to vibrate therewith, an adjustable cupped collar upon said stem, levers connected with said valves and adapted to hook over the edge of the cupped portion of said collar, racks fixed with respect to the frame of the burner, pinions which coöperate with said racks and form movable fulcrums for said levers, whereby varying movements thereof are permitted as the diaphragm is vibrated, and safety catches which are adapted to spring out over the said levers and lock them against retrograde movement when the said levers have completed a predetermined travel.

In witness whereof, I, hereunto subscribe my name this 17th day of February, 1915.

LOUIS AUGUSTUS DRAGO.

In the presence of—
O. JOHNSON,
A. HASKINS.

Copies of this patent may be obtained for five cents each, by addressing the "Commissioner of Patents, Washington, D. C."